(12) United States Patent
Hsu et al.

(10) Patent No.: US 12,365,280 B2
(45) Date of Patent: Jul. 22, 2025

(54) CAMPER FOR A VEHICLE

(71) Applicant: Honda Motor Co., Ltd., Tokyo (JP)

(72) Inventors: Ricky Jukuei Hsu, Rancho Palos Verdes, CA (US); Jia Wei Lin, Chino, CA (US); Romain Daniel Charles Mivelle, Los Angeles, CA (US); Franco Corral, Los Angeles, CA (US); Jean-Hugues Tuan Huy Nguyen, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 18/069,406

(22) Filed: Dec. 21, 2022

(65) Prior Publication Data

US 2024/0208395 A1 Jun. 27, 2024

(51) Int. Cl.
*B60P 3/34* (2006.01)
*B60R 15/02* (2006.01)

(52) U.S. Cl.
CPC .............. *B60P 3/341* (2013.01); *B60R 15/02* (2013.01)

(58) Field of Classification Search
CPC .. B62D 33/0612; B62D 63/061; B62D 33/08; B62D 35/001; B62D 21/14; B60P 3/32; B60P 3/34; B60P 3/36; B60P 3/341; B60P 3/38; B60P 3/39; B60P 3/343; B60P 3/42; B60R 15/02; E04B 1/3442; E04B 1/34305; E04B 1/343; E04H 15/008; E04H 15/06; E04H 15/08; E04H 15/48; E04H 15/46; Y10S 135/902; Y10S 135/904

USPC .......... 296/26.02, 26.05, 26.08, 26.09, 26.1, 296/26.11, 26.15, 37.7, 56, 107.14, 156, 296/159, 161, 163, 164, 165, 171, 172, 296/173, 175, 176; 135/87, 88.05, 88.07, 135/88.1, 88.13, 88.15, 88.16, 88.17, 135/88.18, 902; D12/10, 104
See application file for complete search history.

(56) References Cited

U.S. PATENT DOCUMENTS

| | | | | |
|---|---|---|---|---|
| 467,423 | A * | 1/1892 | Merritt | B60P 1/003 5/119 |
| 642,991 | A * | 2/1900 | MacFee | B60P 1/003 296/26.09 |
| 1,513,227 | A * | 10/1924 | Cornelius | B60P 3/341 135/88.13 |
| 1,935,948 | A * | 11/1933 | Hyrup | E04H 15/06 135/88.13 |
| 1,964,894 | A * | 7/1934 | Rohne | B60P 3/0257 296/26.02 |

(Continued)

FOREIGN PATENT DOCUMENTS

CN 206878489 U 1/2018
CN 209441200 U 9/2019
(Continued)

*Primary Examiner* — Joseph D. Pape
(74) *Attorney, Agent, or Firm* — Morgan Lincoln; American Honda Motor Co., Inc.

(57) ABSTRACT

A camper for a vehicle includes a first cabin portion and a second cabin portion adapted to telescopically extend and retract relative to the first cabin portion in a horizontal direction. Further, each of the first cabin portion and the second cabin portion includes a base portion, and an extension portion. The extension portion is adapted to telescopically extend and retract relative to the base portion in a vertical direction. Moreover, the extension portions are configured to be extended or retracted together.

20 Claims, 4 Drawing Sheets

(56) References Cited

U.S. PATENT DOCUMENTS

| | | | | |
|---|---|---|---|---|
| 1,972,415 A * | 9/1934 | Anderson | B60P 3/34 | 296/172 |
| 2,188,545 A * | 1/1940 | Le Roy | B60P 3/34 | 296/26.11 |
| 2,193,352 A * | 3/1940 | Thomas | B60P 3/34 | 296/26.05 |
| 2,329,419 A * | 9/1943 | Reed | B60P 3/32 | 296/176 |
| 2,343,261 A * | 3/1944 | Marple | B60P 3/34 | 296/26.02 |
| 2,457,581 A * | 12/1948 | McCain | B60P 3/34 | 296/171 |
| 2,756,094 A * | 7/1956 | Marple | B60P 3/34 | 296/26.05 |
| 2,793,067 A * | 5/1957 | Couse | B60P 3/34 | 296/26.02 |
| 2,815,949 A * | 12/1957 | Faeber | B65H 29/60 | 271/302 |
| 2,827,326 A * | 3/1958 | Wetzel | B60P 3/34 | D12/104 |
| 2,893,780 A * | 7/1959 | Ervine | B60P 3/34 | 296/26.02 |
| 2,907,077 A * | 10/1959 | Pugsley | B60P 3/38 | 135/88.13 |
| 2,944,852 A * | 7/1960 | Snyder | B60P 3/34 | 296/171 |
| 2,990,214 A * | 6/1961 | Thirlaway | B60P 3/34 | 296/26.05 |
| 2,995,398 A * | 8/1961 | Davenport | B60P 3/34 | 296/26.1 |
| 3,000,664 A * | 9/1961 | Martin | B60P 3/34 | 296/26.05 |
| 3,083,047 A * | 3/1963 | Babbel | B60P 3/34 | 296/26.02 |
| 3,124,386 A * | 3/1964 | Jonas | B60P 3/34 | 296/26.1 |
| 3,145,044 A * | 8/1964 | Harrison | B60P 3/34 | 296/26.05 |
| 3,212,810 A * | 10/1965 | Bass | B60P 3/34 | 296/171 |
| 3,257,760 A * | 6/1966 | Calthorpe | B60P 3/34 | 52/36.2 |
| 3,304,668 A * | 2/1967 | Edmonds | E04B 1/3442 | 296/173 |
| 3,397,006 A * | 8/1968 | Grant | B60P 3/34 | 296/99.1 |
| 3,429,608 A * | 2/1969 | Farnum | B60P 3/34 | 296/173 |
| 3,463,541 A * | 8/1969 | Garrison | B60P 3/34 | 296/26.05 |
| 3,511,529 A * | 5/1970 | Cutsinger | B60P 3/32 | 52/69 |
| 3,560,042 A * | 2/1971 | McCarthy | B60P 3/34 | 296/26.02 |
| 3,574,389 A * | 4/1971 | Smith | E04B 1/3442 | 296/173 |
| 3,582,131 A * | 6/1971 | Brown | B60P 3/34 | 296/26.02 |
| 3,583,755 A * | 6/1971 | Hedrick, Jr. | B60P 3/341 | D12/104 |
| 3,608,954 A * | 9/1971 | Lynd | B60P 3/34 | 296/26.05 |
| 3,635,515 A * | 1/1972 | White | B60P 3/38 | 296/164 |
| 3,659,893 A * | 5/1972 | Steele | B60P 3/38 | 296/164 |
| 3,697,122 A * | 10/1972 | Richards | B60P 3/341 | 296/26.02 |
| 3,702,617 A * | 11/1972 | Franzen | B60P 3/38 | 135/132 |
| 3,709,551 A * | 1/1973 | McCarthy | B60P 3/34 | 296/26.02 |
| 3,730,580 A * | 5/1973 | Page, Jr. | B60P 3/34 | 296/26.02 |
| 3,740,088 A * | 6/1973 | Ratcliff | B60P 3/34 | D12/104 |
| 3,740,267 A * | 6/1973 | Honigman | C08F 2/008 | 134/42 |
| 3,744,841 A * | 7/1973 | Schmidt | B60P 3/34 | 52/64 |
| 3,774,957 A * | 11/1973 | Basaraba | B60P 3/38 | 296/26.02 |
| 3,833,954 A * | 9/1974 | Daughenbaugh | B60P 3/34 | 296/171 |
| 3,838,880 A * | 10/1974 | Lefebvre | B62D 63/061 | 296/26.02 |
| 3,925,828 A * | 12/1975 | Kim | A47K 3/325 | 4/603 |
| 4,014,586 A * | 3/1977 | Swofford | B60P 3/341 | 296/173 |
| 4,065,166 A * | 12/1977 | Shoemaker | B60P 3/32 | 296/159 |
| 4,109,954 A * | 8/1978 | Wall | B60P 3/341 | 135/88.13 |
| 4,114,942 A * | 9/1978 | Greiner | B60P 3/34 | 296/26.11 |
| 4,133,571 A * | 1/1979 | Fillios | B60P 3/34 | 296/165 |
| 4,181,348 A * | 1/1980 | Whitley | B60P 3/34 | 296/26.02 |
| 4,201,413 A * | 5/1980 | Rowe | B60P 3/34 | 296/176 |
| 4,220,370 A * | 9/1980 | Rice | B60P 3/34 | 296/165 |
| 4,222,604 A * | 9/1980 | Human | B60P 3/34 | 296/172 |
| 4,362,329 A * | 12/1982 | Laube | B60P 3/14 | 296/26.11 |
| 4,457,553 A * | 7/1984 | Larkin | B60P 3/34 | 296/160 |
| 4,603,901 A * | 8/1986 | McIntosh | B60P 3/34 | 296/26.05 |
| 4,784,429 A * | 11/1988 | Hodges | B60J 7/041 | 296/26.05 |
| 5,028,088 A * | 7/1991 | Del Monico | B60P 3/34 | 296/26.04 |
| 5,057,761 A | 10/1991 | Felegyhazi, Sr. | | |
| 5,129,697 A * | 7/1992 | Heikkinen | B60P 3/34 | 296/180.1 |
| 5,135,278 A * | 8/1992 | Kauffman | B60P 3/34 | 296/173 |
| 5,154,469 A * | 10/1992 | Morrow | B62D 21/14 | 296/26.02 |
| 5,310,439 A * | 5/1994 | Matsui | C08G 59/306 | 525/476 |
| 5,358,298 A * | 10/1994 | Fate | B60P 3/38 | 296/159 |
| 5,374,094 A * | 12/1994 | Smith | B60P 3/34 | 296/26.05 |
| 5,628,541 A * | 5/1997 | Gardner | B60P 3/34 | 296/165 |
| 5,669,655 A * | 9/1997 | Hammond | B60P 3/341 | 296/165 |
| 5,757,163 A | 5/1998 | Brotto et al. | | |
| 5,820,190 A * | 10/1998 | Benner | B60P 3/14 | 296/26.09 |
| 5,934,738 A * | 8/1999 | Welles | B60P 3/341 | 296/165 |
| 5,961,176 A * | 10/1999 | Tilly | B60P 3/341 | 296/173 |
| 6,202,362 B1 * | 3/2001 | McManus | B60P 3/34 | 296/26.08 |
| 6,206,456 B1 * | 3/2001 | Steury | B60P 3/34 | 296/26.05 |
| 6,698,634 B2 * | 3/2004 | Thomson | E04H 15/06 | 224/404 |
| 7,464,983 B1 * | 12/2008 | Acosta | E04H 15/06 | 296/159 |

(56) References Cited

U.S. PATENT DOCUMENTS

| | | | | |
|---|---|---|---|---|
| 8,075,036 | B2 * | 12/2011 | Hancock, Sr. | A62C 27/00 296/26.08 |
| 8,230,870 | B2 * | 7/2012 | Horejsh | E04H 15/06 135/88.13 |
| 8,919,861 | B1 * | 12/2014 | Smith | B60P 3/36 296/159 |
| 9,077,053 | B2 | 7/2015 | Schneider et al. | |
| 9,302,605 | B1 * | 4/2016 | Van Pelt | B60P 3/34 |
| 9,481,259 | B2 | 11/2016 | Choi et al. | |
| 9,994,089 | B1 * | 6/2018 | Salter | B60Q 1/2661 |
| 10,414,322 | B1 * | 9/2019 | Coulter | B62D 63/064 |
| 10,651,664 | B2 | 5/2020 | Sergyeyenko | |
| 10,978,887 | B2 | 4/2021 | Nguyen et al. | |
| 11,375,859 | B1 * | 7/2022 | Long | B60R 15/02 |
| 11,440,387 | B1 * | 9/2022 | Younkins, Jr. | B60J 7/1621 |
| 11,505,108 | B2 * | 11/2022 | Backer | E04H 15/06 |
| 11,584,289 | B2 * | 2/2023 | Lee | E04H 15/06 |
| 2005/0067857 | A1 * | 3/2005 | Call | B62D 47/025 296/156 |
| 2005/0161974 | A1 * | 7/2005 | Atcravi | B60P 3/34 296/164 |
| 2005/0269036 | A1 * | 12/2005 | Weddell | E04F 10/0611 160/22 |
| 2006/0049652 | A1 * | 3/2006 | Martin | E04H 15/06 296/26.08 |
| 2007/0262611 | A1 * | 11/2007 | Freeman | B60P 3/341 296/168 |
| 2008/0142059 | A1 * | 6/2008 | Bonebrake | B60P 3/34 135/88.1 |
| 2009/0102231 | A1 * | 4/2009 | Atcravi | B60P 3/34 296/175 |
| 2011/0057474 | A1 * | 3/2011 | Cunningham | B60P 3/38 296/165 |
| 2011/0132421 | A1 * | 6/2011 | Dolsby | E04B 1/3444 135/143 |
| 2015/0275523 | A1 * | 10/2015 | Herrin | E04H 15/58 160/67 |
| 2015/0321716 | A1 * | 11/2015 | Patterson | B62D 63/061 280/509 |
| 2016/0164320 | A1 | 6/2016 | Lo | |
| 2016/0347230 | A1 * | 12/2016 | Pellicer | B62D 33/08 |
| 2018/0079348 | A1 * | 3/2018 | Ronsen | B60P 3/34 |
| 2018/0148107 | A1 * | 5/2018 | Burrows | B62D 37/02 |
| 2018/0258658 | A1 * | 9/2018 | Cruz | E04H 1/02 |
| 2019/0128057 | A1 * | 5/2019 | Futch | E04H 15/08 |
| 2021/0116911 | A1 | 4/2021 | Pjevach | |
| 2021/0323465 | A1 * | 10/2021 | König | B60P 3/34 |
| 2022/0097593 | A1 * | 3/2022 | Backer | B60P 3/341 |
| 2022/0162878 | A1 * | 5/2022 | Burnett | E04H 15/06 |
| 2022/0289097 | A1 * | 9/2022 | Badman | B60P 3/341 |
| 2022/0314863 | A1 * | 10/2022 | Prevost | A01N 53/00 |
| 2022/0410791 | A1 * | 12/2022 | Tezza, II | B60R 15/02 |
| 2023/0034523 | A1 * | 2/2023 | Bailey | E04H 15/06 |
| 2024/0076896 | A1 * | 3/2024 | Heineman | E04H 15/06 |
| 2024/0131910 | A1 * | 4/2024 | Choi | B62D 31/006 |
| 2024/0174306 | A1 * | 5/2024 | Burrows | B62D 35/001 |
| 2024/0181951 | A1 * | 6/2024 | Zhou | B60P 3/34 |

FOREIGN PATENT DOCUMENTS

| | | | | |
|---|---|---|---|---|
| CN | 108016311 B | | 7/2020 | |
| GB | 2451126 A | * | 7/2007 | B60P 1/64 |
| JP | H09123825 A | * | 5/1997 | B60P 3/34 |
| JP | 5358696 B2 | | 12/2013 | |
| KR | 20210078448 A | * | 6/2021 | E04B 1/343 |
| KR | 102292658 B1 | | 8/2021 | |
| WO | 2013010270 A1 | | 1/2013 | |
| WO | 2014068732 A1 | | 5/2014 | |
| WO | 2020198486 A1 | | 10/2020 | |
| WO | 2021021874 A1 | | 2/2021 | |

\* cited by examiner

CAMPER FOR A VEHICLE

BACKGROUND

The disclosed subject matter relates generally to a vehicle. More particularly, the disclosed subject matter relates an extendable camper for a vehicle.

Automobiles have been used for decades for a variety of purposes beyond simply providing basic transportation needs. For example, camper vehicles include extendable structures to provide extra space for facilitating living of a person inside a vehicle. Although these extendable campers serve a useful purpose, there are still shortcomings with the known vehicles. For example, setting up the extendable structures of the campers is difficult. Also, the tent device that attaches to the side of the vehicle may provide an external changing area, or washroom but is difficult to set up and requires tent poles and stakes for structural stability.

SUMMARY

In accordance with one embodiment of the present disclosure, a camper for a vehicle is provided. The camper includes a first cabin portion and a second cabin portion adapted to telescopically extend and retract relative to the first cabin portion in a horizontal direction. Further, each of the first cabin portion and the second cabin portion includes a base portion, and an extension portion. The extension portion is adapted to telescopically extend and retract relative to the base portion in a vertical direction. Moreover, the extension portions are configured to be extended or retracted together.

In accordance with another embodiment of the present disclosure, a vehicle is provided. The vehicle includes a first cabin portion and a second cabin portion adapted to telescopically extend and retract relative to the first cabin portion in a horizontal direction. Further, each of the first cabin portion and the second cabin portion includes a base portion, and an extension portion. The extension portion is adapted to telescopically extend and retract relative to the base portion in a vertical direction. Furthermore, the extension portions are configured to be extended or retracted together when the second cabin portion is arranged in an extended position relative to the first cabin portion.

In accordance with yet a further embodiment of the present disclosure a camper for a vehicle is disclosed. The camper includes a first cabin portion and a second cabin portion adapted to telescopically extend and retract relative to the first cabin portion in a horizontal direction. Further, each of the first cabin portion and the second cabin portion includes a base portion and an extension portion adapted to telescopically extend and retract relative to the base portion in a vertical direction. Furthermore, the extension portions are configured to be extended or retracted together when the second cabin portion is arranged in an extended position relative to the first cabin portion.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

FIGS. 1 to 4 illustrates a side view of a vehicle 100, in accordance with one embodiment of the disclosure. As shown, the vehicle 100 is shown as a camper van having a camper 102 to facilitate a sleeping of one or more passengers inside the vehicle 100. In some embodiments, the vehicle 100 may be camper trailer having the camper 102. Although the camper 102 is shown to be integral to the vehicle 100, it may be envisioned that the camper 102 may be removably mounted to a loading area or a trailer of the vehicle 100.

As shown, the vehicle 100 includes a front end 106, a rear end 108, and a vehicle body 114 extending from the front end 106 to the rear end 108. As shown, the vehicle body 114 includes a front portion 116 extending from the front end 106 towards the rear end 108, and the camper 102 extending from the front portion 116 to the rear end 108. The vehicle 100 also includes a plurality of traction members, for example wheels 120, supporting the vehicle body 114 on a surface and facilitate a movement of the vehicle 100 over the surface. The front portion 116 of the vehicle 100 may support various components and/or assemblies of the vehicle 100. Further, the vehicle 100 includes an engine module (not shown) having an engine and a transmission assembly operatively connected to the engine and adapted to transmit power from the engine to the wheels 120, of the vehicle 100. In an embodiment, the engine may be an internal combustion engine or an electric motor, of any suitable size and configuration for providing a motive power to the vehicle 100. In one embodiment, the engine module may be supported by the front portion 116 of the vehicle body 114.

Figure 1:
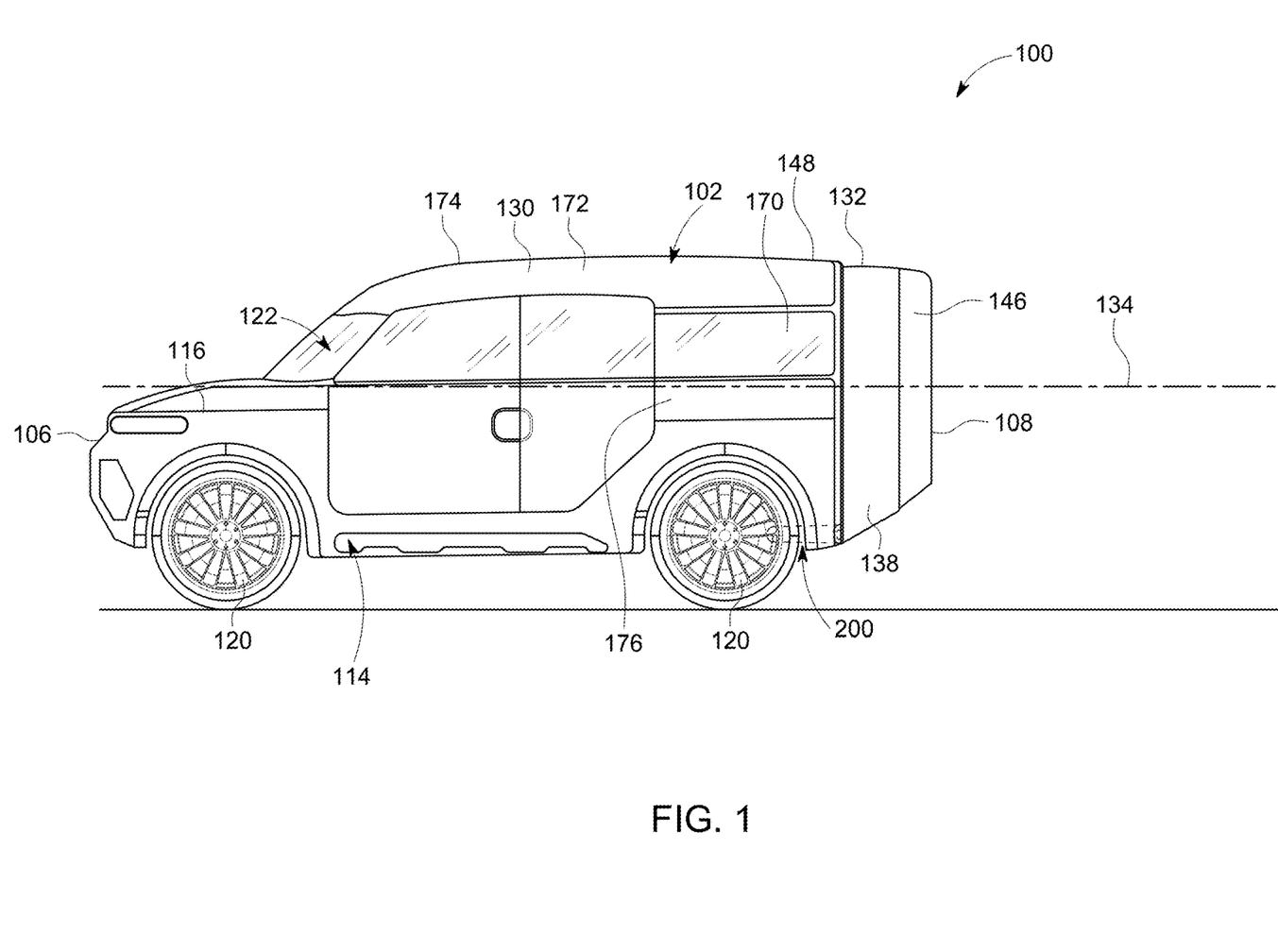
FIG. 1 is a side view of a vehicle having a camper with a second cabin portion arranged in a retracted position relative to a first cabin portion, in accordance with one embodiment of the present disclosure.
Figure 2:
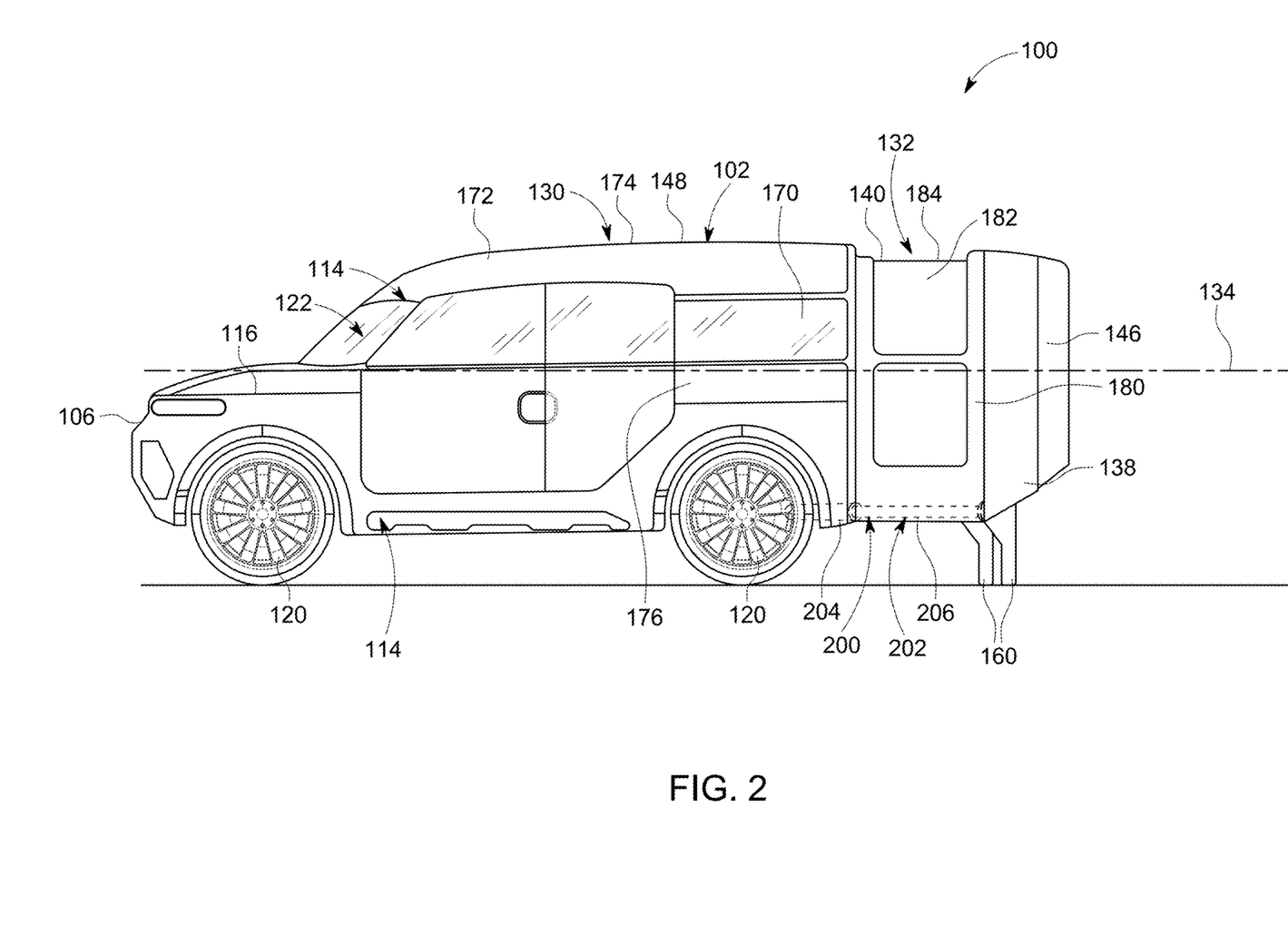
FIG. 2 is a side view of the vehicle having the camper with the second cabin portion arranged in an extended position relative to the first cabin portion, in accordance with one embodiment of the present disclosure.
Figure 3:
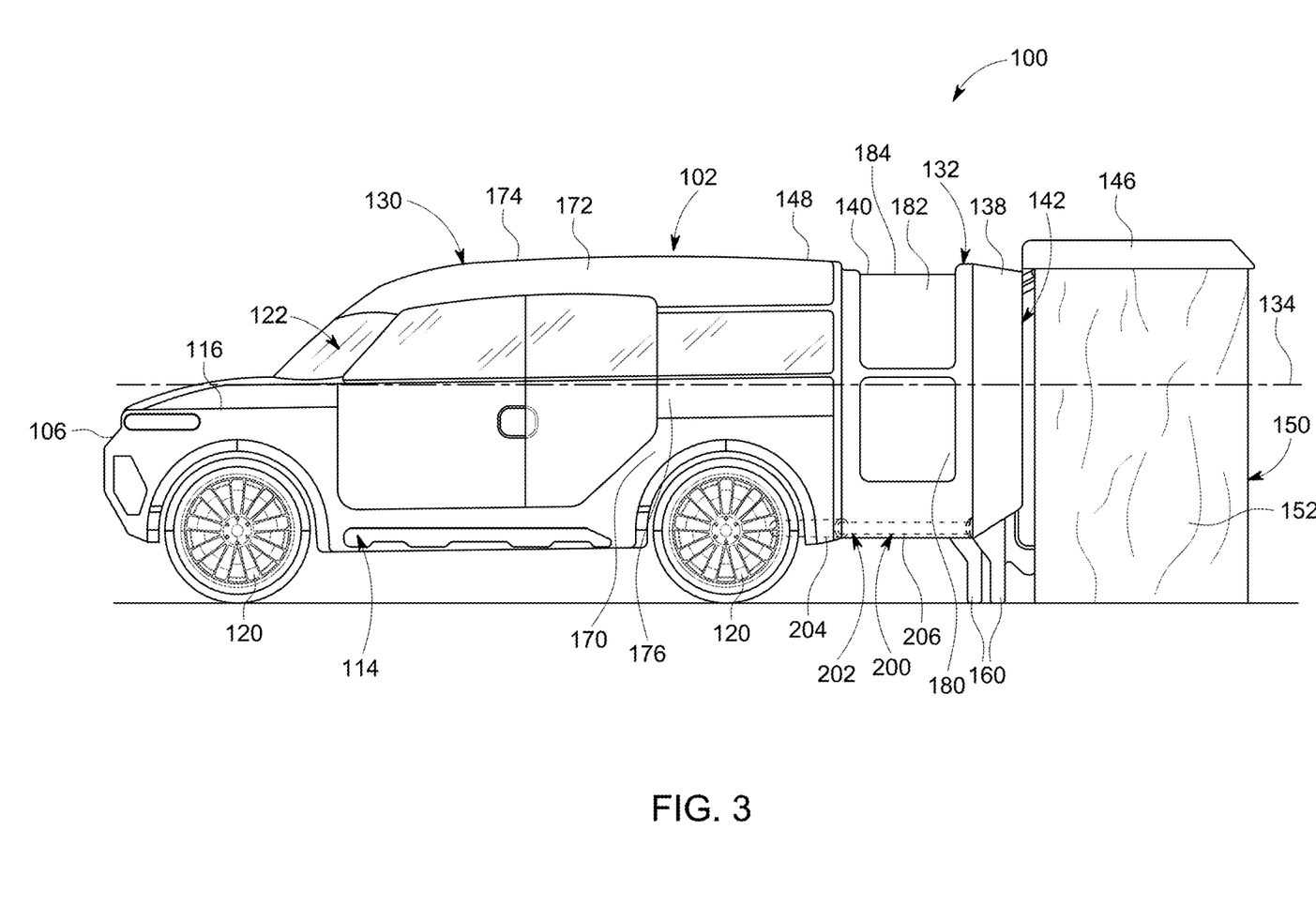
FIG. 3 is a side view of the vehicle with the second cabin portion arranged in the extended and a rear gate arranged in an open position and depicting a curtain arranged in a deployed position, in accordance with one embodiment of the present disclosure.
Figure 4:
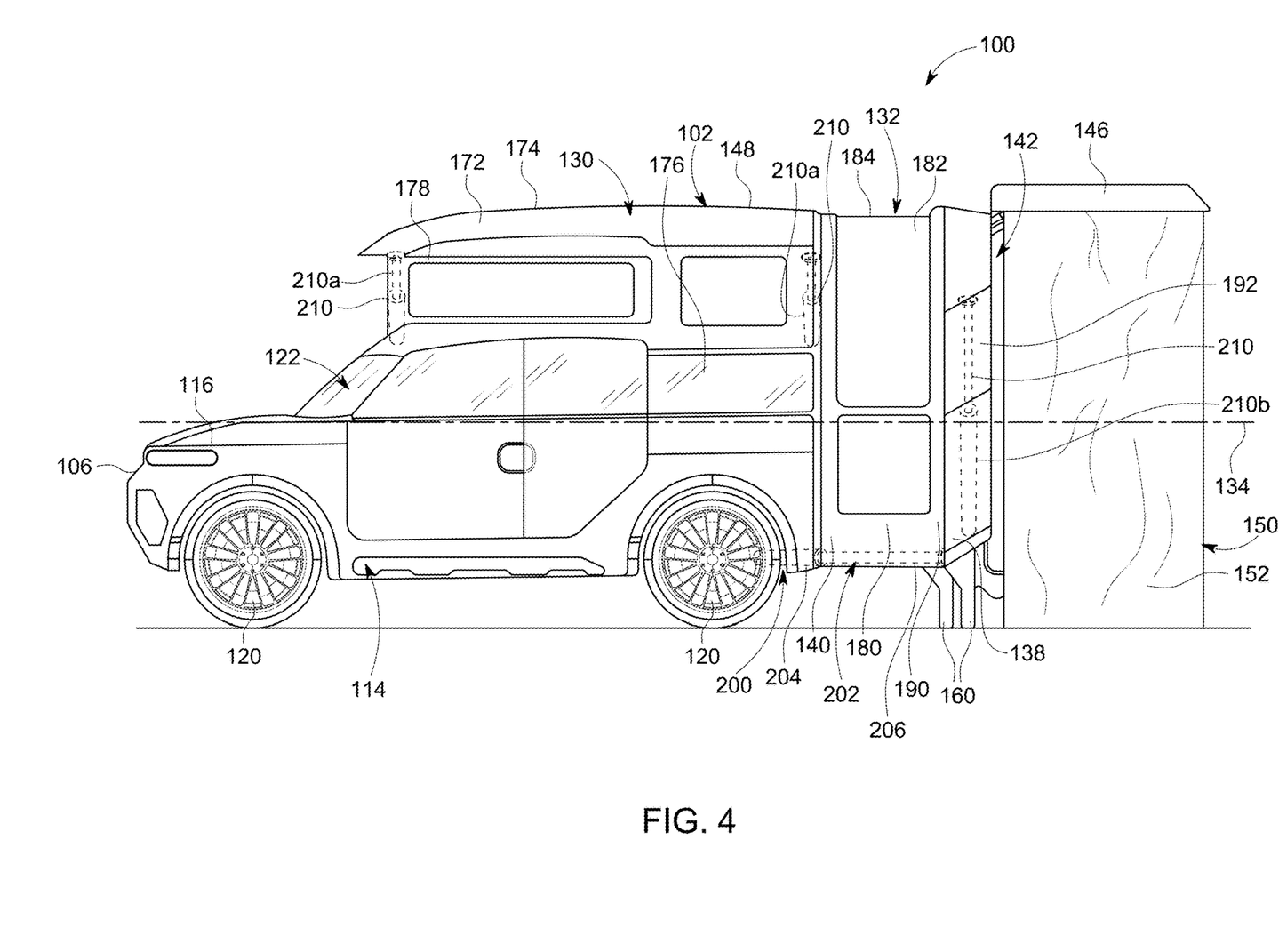
FIG. 4 is a side view of the vehicle depicting the second cabin portion arranged in the extended position and extension portions of the first cabin portion and the second cabin portion disposed extended relative to base portions, in accordance with one embodiment of the present disclosure.

As shown in FIGS. 1 to 4, the camper 102 defines a passenger compartment 122 of the vehicle 100 and includes a first cabin portion 130 and a second cabin portion 132 adapted to extend or retract relative to the first cabin portion 130 in a direction, i.e., horizontal direction, substantially parallel to a longitudinal axis 134 of the vehicle 100. Generally, the second cabin portion 132 is disposed/arranged in a retracted position (shown in FIG. 1) relative to the first cabin portion 130 during a movement or travel of the vehicle 100. The second cabin portion 132 is moved to the extended position (shown in FIGS. 2 to 4) to increase a space of the passenger compartment 122 in a horizontal direction i.e., along the longitudinal axis 134 of the vehicle 100. As shown in FIGS. 2 to 4, the second cabin portion 132 includes a rear hatch structure 138 and a flexible structure 140 connected to the rear hatch structure 138 and the first cabin portion 130. The flexible structure 140 is configured to extend outside the first cabin portion 130 in response to the extension of the second cabin portion 132 to the extended position. Accordingly, the flexible structure 140 is arranged inside the first cabin portion 130 when the second cabin portion 132 is arranged in the retracted position. In this manner, as shown in FIG. 1, the second cabin portion 132 is engaged with the first cabin portion 130 such that at least a portion of the rear hatch structure 138 is arranged outwardly or outside of the first cabin portion 132, contacting the first cabin portion 130, when the second cabin portion 132 is in the retracted position. It may be appreciated that the flexible structure 140 may be made of a weatherproof flexible fabric.

As shown, the rear hatch structure 138 defines a rear access opening 142 of the camper 102 (i.e., the vehicle 100) to facilitate an access of the passenger compartment 122 from a rear of the vehicle 100. To selectively close/cover the access opening 142, the camper 102 includes a rear gate 146 pivotally coupled to the rear hatch structure 138. The rear gate 146 is adapted to pivot between an open position and a close position relative to the rear hatch structure 138. In the close position, the rear gate 146 is arranged covering the access opening 142, as shown in FIGS. 1 and 2, while in the open position, the rear gate 146 may be arranged in a substantially horizontal position and extend substantially parallel to a roof 148 of the camper 102, as shown in FIGS. 3 and 4. Accordingly, in the open position, the rear gate 146 may be arranged at a vertically distance from a ground and provided a canopy or a roof of a washroom 150 (shown in FIG. 3 and FIG. 4).

Further, the camper 102 includes a curtain 152 (shown in FIG. 3 and FIG. 4) coupled to the rear gate 146 and adapted to move between a folded position and a deployed position (shown in FIGS. 3 and 4). The curtain 152 is configured to be moved in the deployed position only when the rear gate 146 is arranged in the open position. Accordingly, the curtain 152 is moved to the folded position to move the rear gate 146 to the close position. In the deployed position, as shown in FIGS. 3 and 4, the curtain 152 extends vertically downwardly from the rear gate 146, arranged in the open position, towards the ground and defines a space of the washroom 150. Accordingly, the curtain 152, in the deployed position, defines the sidewalls of the washroom 150, and the rear gate defines the roof the washroom 150. As shown, the curtain 152 is arranged/extend along a periphery of the rear gate 146 and encloses the space.

To support the second cabin portion 132 in the extended position, the vehicle 100 may include a pair of legs 160 (shown in FIGS. 2 to 4) configured to extend and retract relative to a floor of the second cabin portion 132. The legs 160 are extended in a vertical downward position from the floor of the rear hatch structure 138 to ground to support the second cabin portion 132. In an embodiment, the legs 160 are automatically extended in response to the movement of the second cabin portion 132 to the extended position. In some embodiments, the legs 160 are extended before, after, or during the movement of the second cabin portion 132 to the extended position from the retracted position. Accordingly, the legs 160 are retracted i.e., raised above the ground when the second cabin portion 132 is moved to the retracted position from the extended position.

Referring to FIGS. 3 and 4, the first cabin portion 130 includes a base portion 170 (i.e., first base portion 170) and an extension portion 172 (i.e., first extension portion 172) adapted to telescopically move relative to the first base portion 170 in a vertical direction. The first extension portion 172 extends in the vertical direction relative to the first base portion 170 between a first position (i.e., downward position) and a second position (i.e., upward position). The first base portion 170 includes a floor of the first cabin portion 130, while the first extension portion 172 includes a roof 174 of the first cabin portion 130. In the downward position, the roof 174 is arranged/disposed abutting sidewalls 176 of the first base portion 170, as shown in FIG. 3. As shown, the first base portion 170 defines the sidewalls 176 of the vehicle 100 and includes doors to facilitate an entry and exit of a passenger from the passenger compartment 122. In the upward position, as shown in FIG. 4, the roof 174 is arranged away and at a distance from the sidewalls 176, and a first wall portion 178 of the first extension portion 172 extends between the first base portion 170 and the roof 174. The first wall portion 178 extends vertically upwardly from the sidewalls 176 of the first base portion 170.

Similar to the first cabin portion 130, the second cabin portion 132 includes a base portion 180 (i.e., second base portion 180) and an extension portion 182 (i.e., second extension portion 182) adapted to telescopically extend or retract relative to the second base portion 180 in the vertical direction. The second extension portion 182 extends in the vertical direction relative to the second base portion 180 between a first position (i.e., downward position) and a second position (i.e., upward position). As shown, the second base portion 180 includes a floor of the second cabin portion 132, while the second extension portion 182 defines a roof 184 of the second cabin portion 132. Accordingly, the floors of the first cabin portion 130 and the second cabin portion 132 together define a floor of the passenger compartment 122, and the roofs 174, 184 together define the roof 148 of the vehicle 100. In the upward position, a second wall portion 192 extends between the second base portion 180 and the roof 184. The second wall portion 192 extends vertically upwardly from the sidewalls 190 of the second base portion 180. In an embodiment, the first wall portion 178 and the second wall portion are integral or fixedly attached to each other. In some embodiments, the wall portions 178, 192 may be removably engaged to each other.

To move the second cabin portion 132 relative to the first cabin portion 130, the camper 102 (i.e., the vehicle 100) includes a plurality of actuators 200 (i.e., first actuators 200). In an embodiment, the first actuators 200 are cylinders 202 having a cylindrical casing 204 and a piston 206 configured to telescopically extend and retract relative to the cylindrical casing 204. As shown, an end of the cylindrical casing 204 is attached to the first cabin portion 130 and an end of the piston 206 is attached to the second cabin portion 132. In an embodiment, the piston 206 may be coupled to the rear hatch structure 138 of the second cabin portion 132. In some embodiments, the first actuators 200 may be electric actuators, hydraulic actuators, or pneumatic actuators. Although the first actuators 200 are shown and contemplated as cylinders, it may be envisioned that any type of linear actuators suitable for linearly moving the second cabin portion 132 relative to the first cabin portion 130 may be utilized.

Similar to the first actuators 200, the vehicle 100 (i.e., the camper 102) may include a plurality of second actuators 210 (shown in FIG. 4) to move the first extension portion 172 and the second extension portion 182 relative to the first base portion 170 and the second base portion 180, respectively. A first set of second actuators 210a are coupled to the first base portion 170 and the first extension portion 172, and are configured to enable the extension and retraction of the first extension portion 172 relative to the first base portion 170. In the illustrated embodiment, the first set of second actuators 210a are shown as cylinders, each having a cylindrical casing attached to the sidewall 176 of the first base portion 170 and a piston coupled to the first extension portion 172 of the first cabin portion 130. The first extension portion 172 is retracted and extended by retracting and extending the pistons of the first set of actuators 210a, respectively. Similarly, to extend and retract the second extension portion 182 relative to the second base portion 180, a second set of second actuators 210b are coupled to the second base portion 180 and the second extension portion 182, and are configured to enable the extension and retraction of the second extension portion 182 relative to the second base portion 180. In the illustrated embodiment, the second set of second actuators 210b are shown as cylinders, each having a cylindrical casing attached to a sidewall 190 of the second base portion 180 and a piston coupled to the second extension portion 182 of the second cabin portion 132. The second extension portion 182 is retracted and extended by retracting and extending the pistons, respectively. In some embodiments, the second actuators 210 may be electric actuators, hydraulic actuators, or pneumatic actuators. Although the second actuators 210 are shown and contemplated as cylinders, it may be envisioned that any type of linear actuators suitable for linearly moving the extension portions 172, 182 relative to the base portions 170, 180 may be utilized.

A method for extending the camper 102 in a vertical as well as horizontal direction is now described. The method may include stopping the vehicle 100 at a desired location. After stopping the vehicle 100 or otherwise, a person, for example, a driver of the vehicle 100, actuates the first actuators 200 to move the second cabin portion 132 outwardly of the first cabin portion 130 to the extended position. In an embodiment, the person may actuate and move the legs 160 to the vertically downward position before actuating the first actuators 200. In some embodiments, the person may move the legs 160 to the vertically downward position upon positioning the second cabin portion 132 in the extended position to suitably support the overhang of the second cabin portion 132.

Subsequent to the extension of the second cabin portion 132 relative to the first cabin portion 130, the person may actuate the first set of second actuators 210a and/or the second set of second actuators 210b to move the first extension portion 172 and/or the second extension portion 182 to extend the first cabin portion 130 and/or the second cabin portion 132 in the vertical direction. In the illustrated embodiment, the first extension portion 172 and the second extension portion 182 are integral to each other. Accordingly, the person actuates all the second actuators 210 to move the extension portions 172, 182 together to the upward positions. In some embodiments, the first extension portion 172 and the second extension 182 may be separate from each other. In such a case, the person may actuate the first set of second actuators 210a to extend the first extension portion 172 to the upward position relative to the first base portion 170. Similarly, the person may actuate the second set of second actuators 210b to extend the second extension portion 182 to the upward position relative to the second base portion 180. In some embodiments, the person may move the rear gate 146 to the open position and deploy the curtain 152 to provide the washroom 150.

Further, to arrange/position the second cabin portion 132 to the retracted position, the person, at first, operates the second set of actuators 210 to move the extension portions 172, 182 to the downward position. In the illustrated embodiment, the person operates all the second actuators 210 to move the extension portions 172, 182 to the downward position. Upon moving or retracting the extension portions 172, 182 to the downward position, the person actuates the first actuators 200 to retract/move the second cabin portion 132 to the retracted position. In some embodiments, before retracting the second cabin portion 132, the person may retract the legs 160 such that legs 160 are arranged away from the ground. In this manner, the camper 102 may be operated to move between an original configuration and an extended configuration.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A camper for a vehicle, comprising:
a first cabin portion; and
a second cabin portion adapted to telescopically extend and retract relative to the first cabin portion in a horizontal direction, each of the first cabin portion and the second cabin portion includes
a base portion, and
an extension portion adapted to telescopically extend and retract relative to the base portion in a vertical direction, and
wherein the extension portions are configured to be extended or retracted together, wherein the extension portions are extended upon extension of the second cabin portion relative to the first cabin portion to an extended position, and the second cabin portion is arranged to be retracted upon retraction of the extension portions to associated downward positions.

2. The camper of claim 1, wherein the second cabin portion defines a rear access opening of the camper and the camper further including a rear gate adapted to cover the rear access opening of the camper.

3. The camper of claim 2, wherein the rear gate is adapted to move between an open position and a close position, wherein
in the close position, the rear gate is arranged covering the rear access opening, and
in the open position, the rear gate is arranged substantially parallel to a roof of the camper.

4. The camper of claim 3 further including a curtain engaged to the rear gate and adapted to extend vertically downwardly from the rear gate when arranged in the open position defining a shower enclosure.

5. The camper of claim 1 further including a pair of legs movably engaged with the second cabin portion and adapted to extend vertically downwardly from the second cabin portion to support the second cabin portion in the extended position.

6. The camper of claim 1, wherein second cabin portion includes a rear hatch structure and a flexible structure connected to the rear hatch structure and the first cabin portion, wherein the flexible structure is adapted to telescopically extend or retract relative to the first cabin portion.

7. The camper of claim 1, wherein the rear hatch structure is arranged outwardly of the first cabin portion and contacting the first cabin portion when the second cabin portion is arranged in a retracted position.

8. A vehicle, comprising:
a first cabin portion; and
a second cabin portion adapted to telescopically extend and retract relative to the first cabin portion in a horizontal direction, each of the first cabin portion and the second cabin portion includes
a base portion, and
an extension portion adapted to telescopically extend and retract relative to the base portion in a vertical direction, and
wherein the extension portions are configured to be extended or retracted together when the second cabin portion is arranged in an extended position relative to the first cabin portion, and the second cabin portion is moved to a retracted position when the extension portions are arranged at associated downward positions.

9. The vehicle of claim 8, wherein the second cabin portion defines a rear access opening of the vehicle and the vehicle further including a rear gate adapted to cover the rear access opening of the camper.

10. The vehicle of claim 9, wherein the rear gate is adapted to move between an open position and a close position, wherein
in the close position, the rear gate is arranged covering the rear access opening, and
in the open position, the rear gate is arranged substantially parallel to a roof of the vehicle.

11. The vehicle of claim 10 further including a curtain engaged to the rear gate and adapted to extend vertically downwardly from the rear gate when arranged in the open position defining a shower enclosure.

12. The vehicle of claim 8 further including a pair of legs movably engaged with the second cabin portion and adapted to extend vertically downwardly from the second cabin portion to support the second cabin portion in the extended position.

13. The vehicle of claim 8, wherein second cabin portion includes a rear hatch structure and a flexible structure connected to the rear hatch structure and the first cabin portion, wherein the flexible structure is adapted to telescopically extend or retract relative to the first cabin portion.

14. The vehicle of claim 8, wherein the rear hatch structure is arranged outwardly of the first cabin portion and contacting the first cabin portion when the second cabin portion is arranged in a retracted position.

15. A camper for a vehicle, comprising:
a first cabin portion; and
a second cabin portion adapted to telescopically extend and retract relative to the first cabin portion in a horizontal direction, each of the first cabin portion and the second cabin portion includes
a base portion, and
an extension portion adapted to telescopically extend and retract relative to the base portion in a vertical direction, and
wherein the extension portions are configured to be extended or retracted together when the second cabin portion is arranged in an extended position relative to the first cabin portion, and the second cabin portion is moved to a retracted position from the extended position when the extension portions are arranged at associated downward positions.

16. The camper of claim 15, wherein the second cabin portion defines a rear access opening of the camper and the camper further including a rear gate adapted to move between an open position and a close position, wherein
in the close position, the rear gate is arranged covering the rear access opening, and
in the open position, the rear gate is arranged substantially parallel to a roof of the camper.

17. The camper of claim 16 further including a curtain engaged to the rear gate and adapted to extend vertically downwardly from the rear gate when arranged in the open position defining a shower enclosure.

18. The camper of claim 15 further including a pair of legs movably engaged with the second cabin portion and adapted to extend vertically downwardly from the second cabin portion to support the second cabin portion in the extended position.

19. The camper of claim 15, wherein second cabin portion includes a rear hatch structure and a flexible structure connected to the rear hatch structure and the first cabin portion, wherein the flexible structure is adapted to telescopically extend or retract relative to the first cabin portion.

20. The camper of claim 15, wherein the rear hatch structure is arranged outwardly of the first cabin portion and contacting the first cabin portion when the second cabin portion is arranged in a retracted position.

* * * * *